United States Patent [19]
Bolle et al.

[11] Patent Number: 6,072,015
[45] Date of Patent: Jun. 6, 2000

[54] LIGNIN BASED PAINT

[75] Inventors: Rob Bolle, TG Zoetermeer; Wolfgang Aehle, GB Delfgauw, both of Netherlands

[73] Assignee: Genencor International, Inc., Rochester, N.Y.

[21] Appl. No.: 09/207,302

[22] Filed: Dec. 8, 1998

[51] Int. Cl.[7] ................................. C08H 5/02; C08K 5/00
[52] U.S. Cl. .................... 527/400; 435/170; 435/171; 523/128; 525/54.1; 525/54.24; 525/63; 530/507
[58] Field of Search ............................. 527/400; 435/170, 435/171; 523/128; 525/54.1, 54.24, 63; 530/507

[56] References Cited

U.S. PATENT DOCUMENTS 5,665,573 9/1997 Yde .......................................... 435/118

FOREIGN PATENT DOCUMENTS

WO 93/23477 11/1993 WIPO .

*Primary Examiner*—Nathan M. Nutter
*Attorney, Agent, or Firm*—Christopher L. Stone

[57] ABSTRACT

A method is provided for producing a painted article comprising: (a) preparing a lignin solution comprising lignin and a dye or pigment; (b) mixing the lignin solution with a phenol oxidizing enzyme; (c) incubating the mixture from said step (b) under conditions and for a time sufficient to form a solution of a desired viscosity; (d) contacting or spreading the mixture from the step (c) on an article to be painted; and (e) allowing the mixture to set onto the article by subjecting the article to conditions and for a time sufficient to form a paint on the surface of the article.

16 Claims, No Drawings

LIGNIN BASED PAINT

BACKGROUND OF THE INVENTION

The present invention relates to methods for preparing paints, including protective paints, through enzymatic reactions with components of wood. More particularly, the present invention relates to the enzymatic polymerization of lignin based compositions with phenol oxidizing enzymes.

It has been estimated that nearly 20% of the chemical pulp and dissolving pulp provided worldwide is produced by the sulfite process. Moreover, the significance of this process has grown with the large-scale employment of modifiable magnesium bisulfite pulping. Nonetheless, although there exist a number of uses for lignin sulfonates produced by these processes, it has been difficult to find commercially feasible and desirable means of disposing of this large waste stream for useful purposes. As described in U.S. Pat. No. 4,432,921, the use of spent sulfite liquor as an adhesive for paper, wood and other lignocellulosic materials is well known in the art, and is facilitated by enzymatic activation of the lignin using a phenol oxidizing enzyme. U.S. Pat. No. 5,505,772 describes a method of preparing particle boards by conglutinating wood fragments having middle lamella lignin with a phenol oxidizing enzyme, the process having the advantage that it is necessary to add no additional binder. Further, it has been shown that laccase and other oxidoreductase enzymes, such as peroxidases, can be used as polymerization or curing catalysts for lignin (PCT Publication No. WO/98/31761; EP 648 242).

PCT Publication No. 93/23477 discloses the production of a solution or gel of lignin at high concentrations free of solids by treating the lignin at a high pH and then lowering the pH to a desired value. A binder can be made by subsequently treating with a phenolic oxidase.

PCT Publication No. 95/07604 discloses a method of producing fibreboard, the method comprising the sequential steps of (a) providing an aqueous slurry or suspension of lignin-containing wood fiber material; (b) adding a phenol oxidizing system to the fiber slurry; (c) forming the fiber slurry into a mat of the wood fiber material; and (d) pressing the formed mat by applying heat and pressure to produce the fiberboard.

PCT Publication Nos. 98/31761, 98/31762, 98/31763 and 98/31764 further disclose lignin based adhesives and methods of producing such adhesives for the production of fiberboards.

PCT Publication No. 98/31728 discloses intermediates for the production of polymers from lignin derivatives from the pulp industry, produced by processing lignin derivatives with phenol oxidizing enzymes in the presence of oxidation agents. The invention is characterized in that the lignin derivatives are (a) subjected to enzyme treatment for more than 3 hours in the presence of air; (b) subjected to enzyme treatment for more than 10 minutes while air or oxygen is passed through them; or (c) are oxidized by treatment with chemical oxidation agents. The intermediate is used for the production of polymers of lignin derivatives from the pulp industry, of fiber reinforced duroplastic composite materials from plant fibers, of water proof papers and cardboards, as well as duroplastics from lignin derivatives.

PCT Publication No. WO 98/16357 (Novo Nordisk) discloses a process for impregnating solid wood or wood products with a composition comprising a phenol oxidizing enzyme, an impregnating substance and an oxidizing agent for the purpose of producing an anti-fungal effect or coloring the wood with the impregnating substance. The impregnating substances can be anti-fungal agents or coloring substances, and include phenolic substances and aromatic amines. The impregnating substance undergoes a polymerization reaction or covalent bond formation which fixes the impregnating substance on and within the wood. This disclosure does not disclose a distinct coating which may be applied to a surface regardless of the presence of lignin on the surface.

Thus, there has been much activity in the field of using phenol oxidizing enzymes to react with lignin for various purposes. However, other uses of lignin and sulfite spent liquors are necessary to economically dispose of the large quantity of waste material produced by the pulp and paper industry.

SUMMARY OF THE INVENTION

It is an object of the present invention to provide for a method of producing a paint for use in the protection, beautifying or otherwise treating an object.

It is a further object of the invention to provide for a method of producing such a paint from the waste liquors produced by the pulp and paper industry.

It is yet a further object of the invention to provide for a method of producing a paint from the waste liquors produced by the pulp and paper industry which can be applied to articles having other than lignin containing surfaces such as wood.

According to the present invention, a paint is provide comprising lignin, a phenol oxidizing enzyme system and a dye or pigment.

In another embodiment according to the invention, a method is provided for producing a painted article comprising: (a) preparing a lignin solution comprising lignin and a dye or pigment; (b) mixing the lignin solution with a phenol oxidizing enzyme; (c) incubating the mixture from said step (b) under conditions and for a time sufficient to form a solution of a desired viscosity; (d) contacting or spreading the mixture from the step (c) on an article to be coated; and (e) allowing the mixture to set onto the article by subjecting the article to conditions and for a time sufficient to form a paint on the surface of the article. In a preferred embodiment, the phenol oxidizing enzyme is a catechol oxidase, laccase, bilirubin oxidase, monophenol monooxygenase or peroxidase. Also preferably, the laccase is derived from Aspergillus, Bacillus, Neurospora, Podospora, Botrytis, Collybia, Fomes, Lentinus, Pleurotus, Trametes, Rhizoctonia, Coprinus, Psatyrella, Myceliophthora, Schytalidium, Phlebia or Coriolus. Further preferably, the solution of lignin comprises lignin sulfonate. Also preferably, the lignin solution further comprises a copolymerization agent, for example, acrylic acid.

In another embodiment of the invention, a painted article is provided, wherein the painted article comprises a paint comprising lignin and a phenol oxidizing enzyme.

In yet another embodiment of the invention, the painted article is not a lignocellulosic product.

An advantage of the present invention is that it is possible to prepare a useful item, i.e., a painted article, from the waste product of the pulp and paper industry.

Yet another advantage of the present invention is that it is possible to produce a painted object using an environmentally safe process comprising enzymes and lignin.

Yet another advantage of the present invention is that it is possible to produce a painted object from lignin, wherein the painted object is not a lignocellulosic material or derivative there of itself.

DETAILED DESCRIPTION OF THE PREFERRED EMBODIMENTS

"Phenol oxidizing enzyme" means an enzyme system which is capable of using hydrogen peroxide or oxygen to oxidize oxygen containing phenolic groups. If the phenol oxidizing enzyme requires a source of hydrogen peroxide, the source may be hydrogen peroxide or hydrogen peroxide precursor for in situ production of hydrogen peroxide, e.g., percarbonate or perborate, or a hydrogen peroxide generating enzyme system, e.g., an oxidase and a substrate for the oxidase, or an amino acid oxidase and a suitable amino acid, or a peroxycarboxylic acid or a salt thereof. Hydrogen peroxide may be added at the beginning of or during the process. If the phenol oxidizing enzyme requires oxygen, atmospheric oxygen is usually sufficient, or alternatively, oxygen can be added to the system by percolating oxygen gas or air through the mixture. Phenol oxidizing enzymes can be catechol oxidases (EC 1.10.3.1), laccases (EC1.10.3.2), bilirubin oxidases (EC 1.3.3.5), monophenol monooxygenases (EC 1.14.18.1) or peroxidases (EC 1.11.1.7). Laccases are especially preferred and are known from microbial and plant origins. Preferred microbial laccases are from fungi or bacteria and include those from Aspergillus, Bacillus, Neurospora, Podospora, Botrytis, Collybia, Fomes, Lentinus, Pleurotus, Trametes, Rhizoctonia, Coprinus, Psatyrella, Myceliophthora, Schytalidium, Phlebia and Coriolus. In a most preferred embodiment, the laccase is derived from Trametes, Coprinus, Pleurotus, Stachybotrys or Coriolus.

"Lignin solution" means an aqueous solution of lignin. Generally, it is possible to obtain suitable lignin solutions from the effluent produced during the process of pulping wood fiber and the production of papers, particularly the spent sulfite liquors. Examples of suitable lignin solutions include lignin sulfonates (also known as lignin sulfonates and sulfite lignins) which are the product of sulfite pulping, kraft lignins (also called sulfate lignins) which are obtained via the kraft pulping process, and lignins obtained from other technologies using organic solvents or high pressure steam treatments to remove lignins from plants. However, one of ordinary skill in the art would recognize lignins which are suitable.

"Pigment" or "Dye' means a compound capable of conferring color to a solution. Commonly known pigments or dyes are any that are used in paints, colorants or other items known in the art for which it is desirable to have color attributes. Such pigments or dyes within the present invention should be compatible with the phenol oxidizing enzyme and the lignin solution components. Suitable pigments and dyes are described in Kirk—Othmer Encyclopedia of Chemical Technology, Third Edition, Vol. 17, page 788–889 (John Wiley & Sons).

"Oxidizing agent" means an agent which facilitates the oxidation reaction catalyzed by the enzyme. In the case of phenol oxidizing enzymes, it is possible to use molecular oxygen by reacting the enzyme in the presence of atmospheric oxygen or by introducing oxygen to the reaction vessel under more controlled conditions. It is sometimes desirable to forcibly introduce oxygen by aerating the liquid medium during the reaction.

"Accelerator" or "mediator" compounds are those compounds known in the art to be useful for the mediation of phenol oxidizing enzyme reactions with lignin or other phenolic substances. Mediators are described in, for example, PCT Publication Nos. WO 95/01426 and WO 94/12621.

According to the process of the invention, the lignin solution is contacted with the phenol oxidizing enzyme system and mixed with the dye or pigment and then contacted with the article to be painted in the presence of an oxidizing agent. In practice, it is appropriate to incubate the lignin solution with the phenol oxidizing enzyme system for a time and under conditions sufficient to facilitate some polymerization of the lignin and develop a viscosity which is appropriate for the desired appearance of the painted article. For example, it may be preferred in the event that a thick, textured paint appearance is desired to allow the mixture to incubate for a longer time than if a thin paint is desired, prior to painting the article with the combined lignin, dye or pigment and phenol oxidizing enzyme system solution. As suggested above, if a thick textured paint is desired, the viscosity of the solution should be permitted to become relatively greater such that in applying the solution to the article, the texture of, for example, the application brush, is permanently set into the paint. On the other hand, thin paints would preferably start from a relatively less viscous solution of lignin and enzyme. Routine experimentation may be necessary to develop the precise timing and conditions to obtain the appropriate appearance of the coated article, however, such experimentation is well within the ability of one of ordinary skill in the art.

In any event, the incubation time will be dependent on the conditions under which the reaction takes place, including consideration of temperature, pH, concentration of lignin, concentration of phenol oxidizing enzyme and the presence or not of accelerator compounds which promote the activity of the phenol oxidizing enzyme system.

The concentration of lignin should be such as to facilitate polymerization of the lignin in a suitable amount to allow the paint to set on the article and will be dependent to some extent on the concentration of enzyme used. For example, in a lower concentration of lignin, it may still be possible to produce a suitable paint by adding a relatively higher amount of phenol oxidizing enzyme system. Likewise, in a higher concentration of enzyme, it may be possible to obtain a similarly suitable paint with the addition of less phenol oxidizing enzyme system. Preferably, the concentration of lignin in solution is from 10 to 600 g/l, more preferably from 25 to 400 g/l and most preferably from 50 to 600 g/l.

In the process of the invention, the concentration of oxygen or hydrogen peroxide can be determined using routine methods as an appropriate concentration or amount to facilitate the polymerization of the lignin. The concentration of phenol oxidizing enzyme is that amount which is sufficient to form the paint as provided herein and will depend on, for example, the activity of the enzyme and its performance characteristics, the types of lignin and other components in the mixture. Nonetheless, the concentration of the enzyme can be determined routinely by the worker of ordinary skill.

Generally, the temperature and pH will be dependent on the optimal conditions for the phenol oxidizing enzyme system. For example, where the phenol oxidizing enzyme system is from Trametes versicolor, the optimal pH is between 4.5 and 6.0 and the optimal temperature is from 15° C. to 40° C. Alternatively, where the phenol oxidizing enzyme system is a laccase from *Stachybotrys chartorum*, the optimal pH is between 6.5 and 8.0 and the optimal temperature is from 15° C. to 40° C. The time required for the paint to set will depend on whether conditions are optimal or not, but will generally be at least 1 minute, and will usually range depending on conditions from between 10 minutes and 10 hours.

Other components may be added to the mixture prior to application to the article to accelerate the polymerization of the lignin. For example, mediators may be added to the mixture such as ABTS or HOBT. Similarly, known mediators for use accelerating the activity of phenol oxidizing enzyme systems, for example in bleach compositions, may be used, see e.g., PCT Publication Nos. WO 96/12846 and WO 95/01426.

Where it is desired that the paint be waterproof, it is possible to add copolymerization agents to the lignin solution prior to the application of the paint to facilitate water impermeability of the paint once it is set on the article. For example, acrylic acid, cellulose, starch, pulp, other carbohydrates, and chemical monomers capable of forming a copolymerization product with lignin may be used as a copolymerization agent.

Articles suitable for painting pursuant to the invention provided herein include commonly painted articles such as wood, glass, plastics, metal, ceramics or other solid items capable of supporting the paint. An especially useful application of the present invention is with porous items for which it is desired to provide a sealing effect in conjunction with painting. Another especially useful application of the invention is due to the potential anti-microbial properties of the laccase enzyme in the mixture (see e.g., PCT Publication No. 98/16357).

In one embodiment of the invention, using the present invention it is possible that the article to be coated may surprisingly not be comprised of a substantial portion of lignocellulosic material, wood or paper.

In order to further illustrate the present invention and advantages thereof, the following specific examples are given with the understanding that they are being offered to illustrate the present invention and should not be construed in any way as limiting its scope.

EXAMPLES

Calculation of ABTS (2,2'-azino-bis(3-ethylbenzothiazoline-6-sulfonic acid) Units
Reagents:
50 mM Na acetate (pH 5.0): 1.5 ml
4.5 mM ABTS in water: 0.2 ml
Enzyme sample: 0.1 ml
Dilutions of the enzyme are made in McIlvaine buffer pH 5 (mixture of 50 mM citric acid and 100 mM $NaH_2PO_4$)
Conditions:
Wavelength: 420 nm
Time: 30 seconds
Temperature: 30° C.
Procedure:
Add 0.2 ml ABTS to 1.5 ml 50 mM Na acetate (pH 5.0) in a cuvette and equilibrate to 30° C. in a water bath. Transfer the cuvette to the thermostated cell holder of a spectrophotometer. Add the enzyme sample, mix the contents of the cuvette thoroughly and start measuring, using "auto rate assay". Read for 30 seconds, in 6 second intervals.
Calculation:
U/ml=($\Delta A_{420}$ nm/2) (Dilution factor)
Paint Preparation #1 (with *Trametes villosa* laccase)
2 g of ligninsulfonic acid (sodium salt), available from Extrasynthèse (Genay, France), is dissolved in 4.5 ml McIlvaine buffer pH 5 (mixture of 50 mM citric acid and 100 mM $Na_2HPO_4$ in water). In this solution 0.5 g of Berlin Blue (available from Linova) is suspended with strong stirring. To this suspension finally 3.5 ml *Trametes villosa* laccase (470 ABTS units), 0.1 ml 1 M. citric acid and 0.4 ml water are added, giving a total volume of 10 ml at pH 5.5. (Optimum pH for this system)

Paint Preparation #2 (with *Stachybotrys chartarum* laccase)
4 g of ligninsulfonic acid (sodium salt), available from Extrasynthèse (Genay, France), is dissolved in a mixture of 3 ml water and 3 ml McIlvaine buffer pH 6 (mixture of 50 mM citric acid and 100 mM $Na_2HPO_4$ in water). In this solution 0.5 g of Berlin Blue (available from Linova) is suspended with strong stirring. To this suspension finally 0.66 ml *Stachybotrys chartarum* laccase (560 ABTS units), 0.4 ml 0.5 M NaOH and 0.29 ml water are added, giving a total volume of 10 ml at pH 7. (Optimum pH for this system)
Incubation An aliquot of each of the reaction mixtures A and B were placed in separate reaction tubes (outer diameter 1.6 cm, length 15 cm) The tubes were closed with a screw cap, placed in a rotary mixer (type Heidolph REAX 2) and rotated at a speed of 75 rpm giving an end over end rotation of the reaction tube for 0, 50, 90, 120, 165 and 195 minutes, the paint applied immediately after the incubation.
Painting:

The pre-incubated mixtures were painted with a brush on pine slants and pieces of MDF (Medium Density Fibreboard). For comparison, the paints were applied varying incubation times. An unincubated fresh mixture sinks into the wood and is not glossy, and the samples produced incrementally increased gloss levels with additional incubation. After 2 hours in the tumbling reaction vessel the paint acquires a high gloss on the wood surface and looks like a laqueur. Moreover, after 2 hours the incubated mixture acquires a viscosity which produces texture to the paint from the brush hairs, with additional incubation producing additional viscosity. The paints (in all states) are much more resistant to damage through mechanical treatment than a suspension of Berlin Blue in water alone.

We claim:
1. A method for producing a painted article comprising:
  (a) preparing a solution of lignin;
  (b) mixing said lignin solution with a phenol oxidizing enzyme, and a dye or pigment;
  (c) incubating said mixture from said step (b) under conditions and for a time sufficient to form a solution of a desired viscosity;
  (d) contacting or spreading said mixture from said step (c) on an article to be painted;
  (e) allowing said paint to set onto said article by subjecting said article to appropriate conditions and for a sufficient time to form a painted surface on the article.
2. The method of claim 1, wherein said phenol oxidizing enzyme is a catechol oxidase, laccase, bilirubin oxidase, monophenol monooxygenase or peroxidase.
3. The method of claim 2, wherein said laccase is derived from Aspergillus, Bacillus, Neurospora, Podospora, Botrytis, Collybia, Fomes, Lentinus, Ploeurotus, Trametes, Rhizoctonia, Coprinus, Psatyrella, Myceliophthora, Schytalidium, Phlebia or Coriolus.
4. The method of claim 1, wherein said solution of lignin comprises lignin sulfonate.
5. The method of claim 1, wherein said lignin is present in a concentration of at least 200 g/l of aqueous solution.
6. The method of claim 1, wherein said lignin solution comprising said phenol oxidizing enzyme solution is allowed to set for 10 minutes.
7. A painted article produced by the method according to claim 1.
8. The painted article of claim 7, wherein said article comprises wood, glass, plastic, metal or ceramic.
9. A painted article, wherein said article is treated with a paint comprising lignin and a phenol oxidizing enzyme.

10. A paint comprising lignin, a dye or pigment and a phenol oxidizing system.

11. The paint of claim 10, wherein said phenol oxidizing enzyme is a catechol oxidase, laccase, bilirubin oxidase, monophenol monooxygenase or peroxidase.

12. The paint of claim 11, wherein said laccase is derived from Aspergillus, Bacillus, Neurospora, Podospora, Botrytis, Collybia, Fomes, Lentinus, Ploeurotus, Trametes, Rhizoctonia, Coprinus, Psatyrella, Myceliophthora, Schytalidium, Phlebia or Coriolus.

13. The paint of claim 10, wherein said solution of lignin comprises lignin sulfonate.

14. The paint of claim 10, wherein said lignin is present in a concentration of from 50 g/l to 200 g/l of aqueous solution.

15. The paint of claim 10, wherein said phenol oxidizing enzyme is present in a concentration of at least 100 ABTS Units per ml of lignin solution.

16. The paint of claim 10, wherein said lignin solution comprising said phenol oxidizing enzyme solution is allowed to set for 10 minutes.

* * * * *